(12) United States Patent
Ding

(10) Patent No.: US 9,846,074 B2
(45) Date of Patent: Dec. 19, 2017

(54) SYSTEM FOR AND METHOD OF MONITORING FLOW THROUGH MASS FLOW CONTROLLERS IN REAL TIME

(75) Inventor: Junhua Ding, Boxborough, MA (US)

(73) Assignee: MKS Instruments, Inc., Andover, MA (US)

( * ) Notice: Subject to any disclaimer, the term of this patent is extended or adjusted under 35 U.S.C. 154(b) by 545 days.

(21) Appl. No.: 13/354,988

(22) Filed: Jan. 20, 2012

(65) Prior Publication Data

US 2013/0186486 A1    Jul. 25, 2013

(51) Int. Cl.
*G01F 25/00*    (2006.01)
*G05D 7/06*    (2006.01)

(52) U.S. Cl.
CPC ......... *G01F 25/003* (2013.01); *G05D 7/0635* (2013.01); *Y10T 137/776* (2015.04); *Y10T 137/7759* (2015.04); *Y10T 137/7761* (2015.04); *Y10T 137/8326* (2015.04)

(58) Field of Classification Search
CPC ............... G05D 7/0635; G01F 25/003; Y10T 137/7761; Y10T 137/776; Y10T 137/8158
USPC ..................... 137/487.5, 487, 551; 73/196
See application file for complete search history.

(56) References Cited

U.S. PATENT DOCUMENTS

| 3,952,759 A | 4/1976 | Ottenstein |
| 4,487,213 A * | 12/1984 | Gates et al. ...................... 137/2 |
| 6,394,120 B1 * | 5/2002 | Wichert ............................. 137/2 |
| 6,439,253 B1 * | 8/2002 | Easton .............................. 137/9 |
| 7,204,158 B2 | 4/2007 | Morgan et al. |
| 7,636,640 B2 * | 12/2009 | Wang et al. ..................... 702/45 |
| 7,654,151 B2 * | 2/2010 | Agar et al. ................. 73/861.01 |
| 7,658,204 B2 * | 2/2010 | Ishida ............................ 137/486 |
| 7,823,436 B2 | 11/2010 | Monkowski et al. |
| 8,109,289 B2 * | 2/2012 | Trnka et al. .................. 137/487 |

(Continued)

FOREIGN PATENT DOCUMENTS

| CN | 1513110 | 7/2004 |
| CN | 101208641 | 6/2008 |

(Continued)

OTHER PUBLICATIONS

International Search Report and the Written Opinion dated Mar. 11, 2013 for Corresponding PCT Application No. PCT/US2013/020790.

(Continued)

*Primary Examiner* — Mary McManmon
*Assistant Examiner* — Nicole Gardner
(74) *Attorney, Agent, or Firm* — McDermott Will & Emery LLP

(57) ABSTRACT

A mass flow controller comprises: a first flow meter constructed and arranged to measured flow rate of mass through the mass flow controller; a second flow meter constructed and arranged to measure flow rate of mass through the mass flow controller; a control valve constructed and arranged so as to control the flow rate of mass through the mass flow controller in response to a control signal generated as a function of the flow rate as measured by one of the flow meters; and a system controller constructed and arranged to generate the control signal, and to provide an indication when a difference between the flow rate of mass as measured by the first flow meter and the flow rate of mass as measured by the second flow meter exceeds a threshold.

15 Claims, 3 Drawing Sheets

(56) References Cited

U.S. PATENT DOCUMENTS

| | | | |
|---|---|---|---|
| 8,240,324 B2 | 8/2012 | Monkowski et al. | |
| 8,265,888 B2 | 9/2012 | Chung et al. | |
| 8,271,210 B2 | 9/2012 | Chung et al. | |
| 8,271,211 B2 | 9/2012 | Chung et al. | |
| 8,356,623 B2 * | 1/2013 | Isobe et al. | 137/486 |
| 8,504,318 B2 | 8/2013 | Mendelson et al. | |
| 8,751,180 B2 | 6/2014 | Lull et al. | |
| 2002/0083984 A1 | 7/2002 | Easton | |
| 2003/0039550 A1 | 2/2003 | Wichert | |
| 2006/0278276 A1 | 12/2006 | Tanaka et al. | |
| 2006/0283254 A1 | 12/2006 | Ding et al. | |
| 2007/0113641 A1 | 5/2007 | Ding et al. | |
| 2009/0112504 A1 | 4/2009 | Ding et al. | |
| 2009/0183548 A1 | 7/2009 | Monkowski et al. | |
| 2009/0183549 A1 | 7/2009 | Monkowski et al. | |
| 2009/0212847 A1 | 8/2009 | Schultz et al. | |
| 2009/0266139 A1 | 10/2009 | Gregor et al. | |
| 2010/0080262 A1 | 4/2010 | McDonald | |
| 2010/0125424 A1 | 5/2010 | Ding et al. | |
| 2010/0209859 A1 | 8/2010 | Inoue et al. | |
| 2011/0022334 A1 | 1/2011 | Ding et al. | |
| 2011/0108126 A1 | 5/2011 | Monkowski et al. | |
| 2011/0139271 A1 | 6/2011 | Hirata et al. | |
| 2011/0284500 A1 * | 11/2011 | Rappl et al. | 219/74 |
| 2012/0132291 A1 | 5/2012 | Monkowski et al. | |
| 2012/0216888 A1 | 8/2012 | Ding et al. | |
| 2012/0304781 A1 | 12/2012 | Monkowski et al. | |
| 2013/0186486 A1 | 7/2013 | Ding | |

FOREIGN PATENT DOCUMENTS

| | | | | |
|---|---|---|---|---|
| CN | 101238357 | | 8/2008 | |
| CN | 101796378 | | 8/2010 | |
| CN | 102057340 B | | 5/2011 | |
| CN | 102124418 | | 7/2011 | |
| DE | 10 2009 046 758 | * | 11/2009 | F17D 5/02 |
| DE | 102009046758 A1 | | 5/2011 | |
| JP | H3166611 | | 7/1991 | |
| JP | H3211601 | | 9/1991 | |
| JP | H08312908 | | 11/1996 | |
| JP | 2004246826 | | 9/2004 | |
| JP | 2011530755 | | 12/2011 | |
| JP | 2012-237733 A | | 6/2012 | |
| JP | 2003167630 | | 6/2013 | |
| TW | I223056 | | 11/2004 | |
| WO | WO2010018191 | | 2/2010 | |
| WO | WO2011047361 | | 4/2011 | |
| WO | 2013134141 A2 | | 9/2013 | |
| WO | WO2013134141 | | 9/2013 | |

OTHER PUBLICATIONS

Brooks Instrument, Installation and Operation Manual, X-TMF-GF100-Series-MFC-eng. Part No. 541B137AAG, 82 pages (2013).
Brooks Instrument, Data Sheet GF135 Digital Mass Flow Controller, 10 pages (2013).
International Search Report and the Written Opinion from corresponding PCT Application No. PCT/US2013/057184 dated Feb. 19, 2014.
International Search Report and the Written Opinion from corresponding PCT Application No. PCT/US2013/020790 dated Mar. 18, 2013.
International Search Report and the Written Opinion from corresponding PCT Application No. PCT/US2015/012851 dated Apr. 28, 2015.
International Search Report and the Written Opinion from corresponding PCT Application No. PCT/US2015/015831 dated May 22, 2015.
Office Action dated Oct. 2, 2015 from corresponding Taiwan Patent Application No. 104106156.
Office Action dated Sep. 23, 2015 from corresponding Korean Patent Application No. 10-2014-7022413.
Office Action dated Aug. 18, 2015 from corresponding Japanese Application No. 2014-553321.
Office Action dated Dec. 4, 2015 from corresponding Chinese Patent Application No. 201380005938.6.

* cited by examiner

SYSTEM FOR AND METHOD OF MONITORING FLOW THROUGH MASS FLOW CONTROLLERS IN REAL TIME

CROSS-REFERENCE TO RELATED APPLICATIONS

None

BACKGROUND

Field

This disclosure relates generally to mass flow controllers (MFCs), and more particularly to a system for and method of monitoring flow through MFCs in real time. As used herein the term "gas" includes the term "vapor(s)" should the two terms be considered different.

Overview

Mass flow controllers (MFCs) are devices for measuring and controlling the flow of gases. They are usually used to control the flow of gases during a semiconductor manufacturing process wherein the flow of gases into a semiconductor tool, such as a vacuum chamber, must be carefully controlled in order to produce high yield semiconductor products. MFCs are usually designed and calibrated to control specific types of gas at particular ranges of flow rates. The devices control the rate of flow based on a given setpoint, usually predetermined by the user or an external device such as the semiconductor tool itself. MFCs can be either analog or digital. They are typically designed to be used with pressure ranges of the inlet gases, with low pressure and high pressure MFCs being available. All MFCs have an inlet port, and outlet ports, a mass flow meter including a mass flow sensor and a proportional control valve. A system controller is used as a part of a feedback control system that provides a control signal to the control valve as a function of a comparison of the flow rate as determined by the setpoint with the measured flow rate as sensed by the mass flow sensor. The feedback control system thus operates the valve so that the measured flow is maintained at the flow rate as determined by the setpoint.

Such control systems assume that the MFC remains in calibration within certain tolerances. In order test whether an MFC is within the tolerances of calibration, the MFC is typically tested off line with such devices as mass flow verifiers. The latter are used to test the flow rates. While off line testing is very accurate, there is always a problem that a MFC can become out of calibration during the running of a process (in real time), and not be detected until the process is completed. Often this can result in lower yields of semiconductor product, and even a complete failure resulting in the loss of the entire product yield. This can be expensive, and is clearly undesirable. What is needed is a device and method for continually testing the calibration settings of a MFC in real time while processes are being run.

Description of Related Art

Reference is made to Japanese Published Application 2004-246826A2004.9.2

SUMMARY

A mass flow controller comprises:

a first flow meter constructed and arranged to measured flow rate of mass through the mass flow controller;

a second flow meter constructed and arranged to measure flow rate of mass through the mass flow controller;

a control valve constructed and arranged so as to control the flow rate of mass through the mass flow controller in response to a control signal generated as a function of the flow rate as measured by one of the flow meters; and a system controller constructed and arranged to generate the control signal, and to provide an indication when a difference between the flow rate of mass as measured by the first flow meter and the flow rate of mass as measured by the second flow meter exceeds a threshold.

These, as well as other components, steps, features, objects, benefits, and advantages, will now become clear from a review of the following detailed description of illustrative embodiments and the accompanying drawings.

BRIEF DESCRIPTION OF DRAWINGS

The drawings disclose illustrative embodiments. They do not set forth all embodiments. Other embodiments may be used in addition or instead. Details which may be apparent or unnecessary may be omitted to save space or for more effective illustration. Conversely, some embodiments may be practiced without all of the details which are disclosed. When the same numeral appears in different drawings, it refers to the same or like components or steps.

DETAILED DESCRIPTION OF ILLUSTRATIVE EMBODIMENTS

Illustrative embodiments are now discussed. Other embodiments may be used in addition or instead. Details which may be apparent or unnecessary may be omitted to save space or for a more effective presentation. Conversely, some embodiments may be practiced without all of the details which are disclosed.

Figure 1:
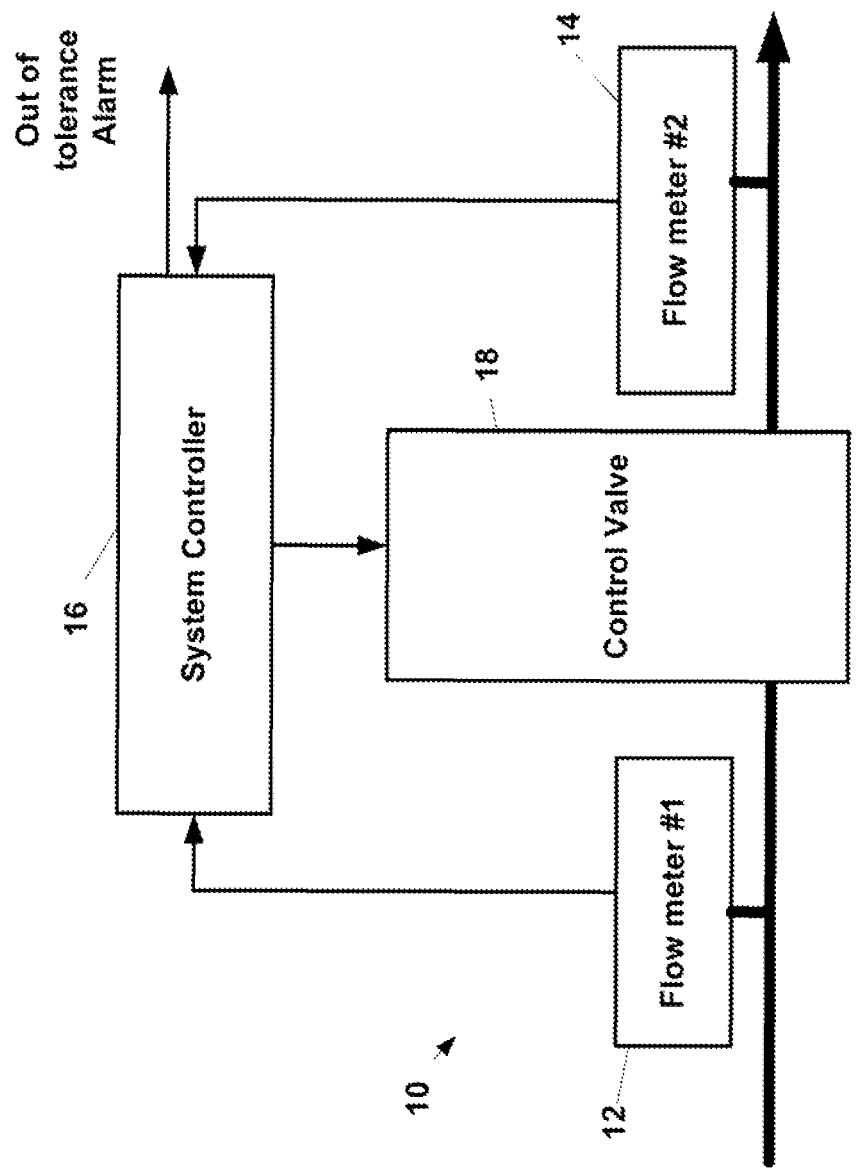
FIG. 1 is a simplified block diagram of a MFC constructed and arranged to control flow through the MFC and monitor the accuracy of the MFC in real time.

Referring to FIG. 1, the illustrated, exemplary mass flow controller 10 is constructed and arranged to control flow through the MFC and monitor the accuracy of the MFC in real time. As shown the controller 10 includes two flow meters 12 and 14, each independently generating a signal representing the measured rate of flow of gas through the MFC. The output of the two flow meters are provided to the system controller 16. The controller 16 processes the two signals received from the two flow meters 12 and 14 and provides a control signal to the proportional control valve 18 based on the flow measured by one of the flow meters and a set point, and an indication ("alarm") signal when a determination is made that the difference in the flow rates as measured by the two meters exceeds a predetermined threshold.

Figure 2:
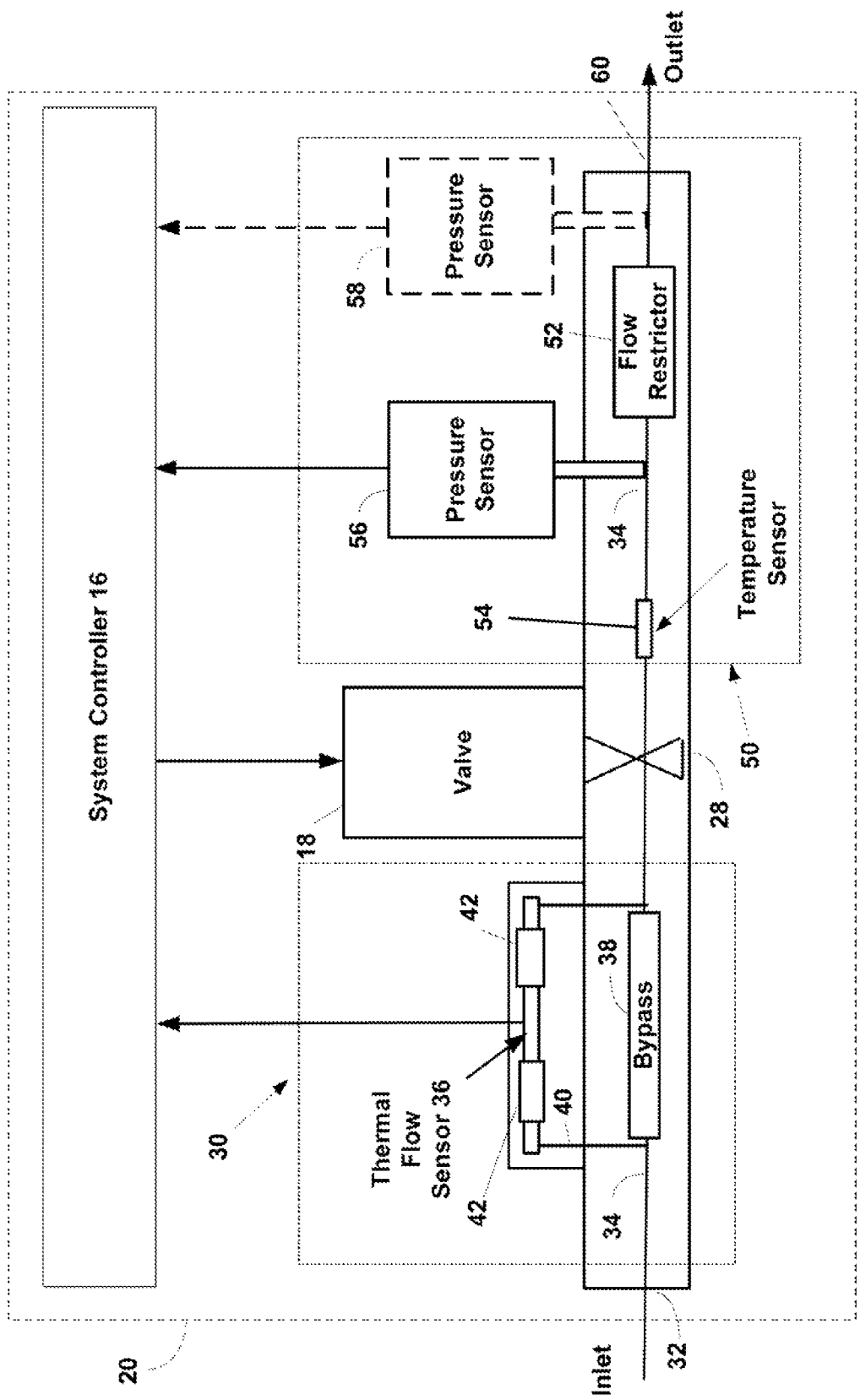
FIG. 2 is a block diagram of an embodiment of a MFC employing the teachings described here.

A more detailed exemplary embodiment of a MFC, indicated generally at 20, is shown in FIG. 2. The MFC 20 is constructed and arranged so as to control flow through the MFC and monitor the accuracy of the MFC in real time. As shown gas is received at the input port 32 of block 28 including a conduit defining the main flow path 34 through the MFC to the outlet port 60. The first flow meter 30 is shown as a thermal mass flow meter. Thermal mass flow meters typically include a thermal mass flow sensor 36. The latter usually includes a bypass element 38 disposed in the bypass of the main flow path 34 of the gas flow through the block 28. A U-shaped capillary tube 40 has opposite ends respectively connected to the primary pathway at the upstream and downstream ends of the bypass element 38. One or more resistance elements 42 (two being the most common) are used to measure flow through the capillary tube based on temperature measurements as a function, in the example, of the difference in resistances of the two resistance elements, which in turn is a function of the difference in the sense temperatures of the fluid, a measure of the mass flow rate. The bypass element 38 is designed to ensure that gas flow through the bypass element 38 between the two ends of the capillary tube 40 is laminar. By maintaining laminar flow, the measured flow rate of gas through the capillary tube will be an accurate percentage of the flow through the main flow path 34. Thus, the sensed flow rate through the capillary tube 40 will be an accurate measure of the flow rate though the MFC 20 and exiting outlet port 60. Data representing the sensed flow rate is communicated to the system controller 16.

The second flow meter 50 is shown as a differential pressure flow meter. For choked flow conditions, the flow meter 50 includes a flow restrictor 52 (for example, a critical flow nozzle or orifice), and a temperature sensor 54 and an upstream pressure sensor 56 arranged to measure the respective temperature and pressure of the gas flowing through the main flow path 34 upstream from the flow restrictor 52. Data representing the sensed temperature and pressure is transmitted to the system controller for use in determining mass flow through the second flow meter 50 as function of these sensed measurements. For non-choked flow conditions, a second or downstream pressure sensor 58 is provided on the downstream side of the flow restrictor 52. Data representing the sensed temperature, upstream pressure and downstream pressure is transmitted to the system controller 16 for determining mass flow through the second meter 50 as a function of the sensed measurements. The second measurement provided by the second flow meter 50 (in both the choked and non-choked embodiments) is independent of the measurement provided by the first flow meter 30.

Figure 3:
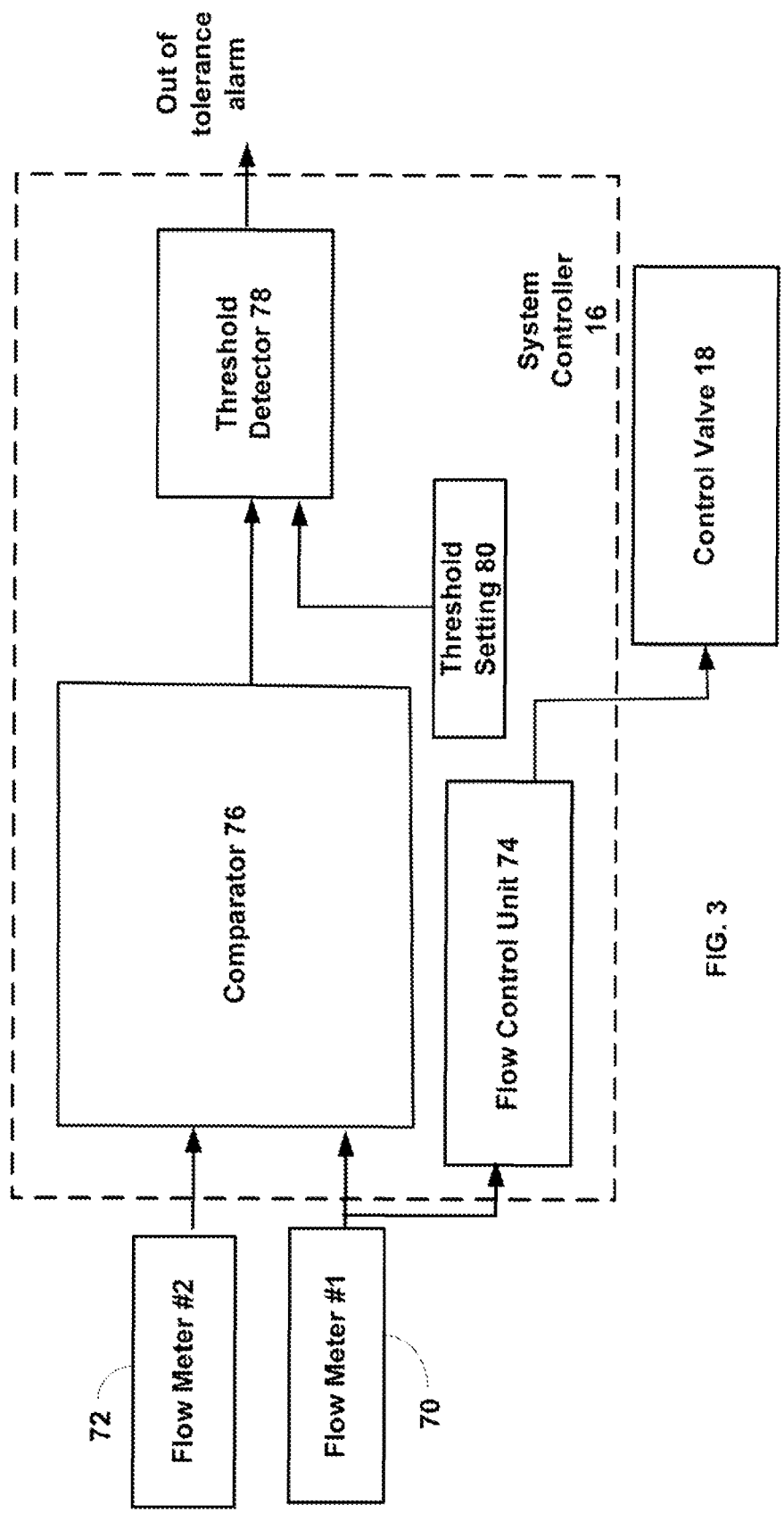
FIG. 3 is a block diagram of components for generating a signal indicating when an MFC, such as the ones described in connection with FIGS. 1 and 2 are out of calibration tolerances.

Referring to FIG. 3, the system controller 16 processes the outputs of the flow meters 70 and 72 so as to provide two flow measurements of the same flow through the MFC. As shown flow meter 70 is provided to a flow control unit 74, which in turn applies a control signal to the proportional control valve 18. A comparator 76 is provided to compare the data representing the sensed flow measurements provided by the two meters 70 and 72 to provide an output signal as a function of and representing any difference between the two measurements. This output signal is compared to some threshold value (provided by threshold setting 80) by a threshold detector 78. Should the output signal of comparator 76 exceed the threshold value (wherein the two meters provide different flow measurements such that the difference between the two exceed a predetermined threshold), the threshold detector provides an alarm or indicating signal to alert the user that at least one of the meters is inaccurate, and that the MFC should be taken off line and further tested. It should be noted that the value of the threshold setting at 80 can be provided in anyone of a number of ways including setting the value during the initial factory setup of the MFC, or user programmed. The threshold value can be set as a function of permissible tolerances in mass flow for the particular process with which the controller is used to deliver gas. Thus, some processes may permit greater tolerances in flow than others.

While the first and second flow meters have been respectively described as a thermal mass flow meter and a differential pressure flow meter in FIG. 2, they can be other types of flow meters as well, such as coriolis flow meter, magnetic flow meter or ultrasonic flow meter, depending on the application for which the MFC 20 is intended. Although it is preferred that the type of the first flow meter is different from that of the second flow meter, the two flow meters can be same type. For example, both flow meters can be either thermal mass flow meters or differential pressure flow meters. Further, although the first flow meter 30 is located upstream to the control valve 18 and the second flow meter is located downstream to the control valve 18, the locations of these two flow meters can be anywhere along the main flow path 34 of the MFC. For example, both flow meters can be upstream or downstream to the control valve 18.

As shown in FIG. 3, while the measurement from the first flow meter 70 is used in the flow control unit 74 to control the MFC flow output and the measurement from the second flow meter 72 is used to verify the accuracy of the MFC in real time, the measurement from the second flow meter 72 can be used in the flow control unit 74 to control the flow output of the MFC 20 and the measurement from the first flow meter 70 be used for flow verification.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

Nothing which has been stated or illustrated is intended or should be interpreted to cause a dedication of any component, step, feature, object, benefit, advantage, or equivalent to the public, regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

What is claimed is:

1. A self-contained mass flow controller (MFC) defining a main flow path with a single control valve for semiconductor processing, the MFC comprising:
- a block including a conduit defining the main flow path, the block having an input port and an outlet port;
- a first flow meter disposed along the main flow path and operative to measure flow rate of mass of gas through the mass flow controller in real time during the running of a process, and to produce a first flow measurement signal representing a measured flow rate through the MFC;
- a second flow meter disposed along the main flow path and operative to measure flow rate of mass of gas through the mass flow controller in real time during the running of a process, and to produce a second flow measurement signal representing a measured flow rate through the MFC, wherein the first and second flow meters measure the flow rate of mass simultaneously;
- wherein the first and second flow meters are of different types;
- wherein the control valve is disposed along the main flow path and operative to control the flow rate of mass of gas through the mass flow controller in response to a control signal provided by a system controller receiving both the first and second flow measurement signals produced by the first and second flow meters, respectively; and
- the system controller operative to receive the first and second flow measurement signals produced by the first and second flow meters, respectively, and to generate the control signal based on a selected one of the first and second flow measurement signals, wherein the other of the first and second flow measurement signals is used by the system controller to verify the selected flow measurement signal, and wherein the system controller is operative to provide an alarm signal indicating when a difference between the first and second flow measurement signals exceeds a predetermined threshold;
- wherein the system controller includes:
  (i) a flow control unit operative to receive the two signals produced by the first and second flow meters, and to use one of those signals for the control signal for the control valve;
  (ii) a comparator operative to receive the first and second flow measurement signals produced by the first and second flow meters, respectively, and to produce as an output a difference signal representing the difference between the first and second flow measurement signals that are received from the first and second flow meters, respectively; and
  (iii) a threshold detector operative to compare the difference signal to a predetermined threshold value, and to produce the alarm signal when the difference signal exceeds the predetermined threshold value.

2. A mass flow controller according to claim 1, wherein at least one of the flow meters is a differential pressure flow meter.

3. A mass flow controller according to claim 1, wherein at least one of the flow meters is a thermal mass flow meter.

4. A mass flow controller according to claim 3, wherein the other of the flow meters is a differential pressure flow meter.

5. A mass flow controller according to claim 1, wherein at least one of the flow meters is a Coriolis flow meter.

6. A mass flow controller according to claim 1, wherein at least one of the flow meters is a magnetic flow meter.

7. A mass flow controller according to claim 1, wherein at least one of the flow meters is an ultrasonic flow meter.

8. A mass flow controller according to claim 1, wherein the control signal is generated as a function of the flow rate as measured by a thermal mass flow meter.

9. A mass flow controller according to claim 8, wherein the other flow meter is a differential pressure flow meter.

10. A mass flow controller according to claim 1, wherein the control signal is generated as a function of the flow rate as measured by a differential pressure flow meter.

11. A mass flow controller according to claim 10, wherein the other flow meter is a thermal mass flow meter.

12. A mass flow controller according to claim 1, wherein the threshold is user set.

13. A mass flow controller according to claim 1, wherein the threshold is factory set.

14. A mass flow controller according to claim 1, wherein the threshold is set as a function of permissible tolerance in mass flow for the process with which the controller is used to deliver gas.

15. A mass flow controller according to claim 1, wherein the first flow meter is configured to measure flow upstream of the control valve.

* * * * *